(12) United States Patent
Abe et al.

(10) Patent No.: US 7,703,862 B2
(45) Date of Patent: Apr. 27, 2010

(54) BRAKE HYDRAULIC PRESSURE CONTROL DEVICE

(75) Inventors: Taizo Abe, Takahama (JP); Moriharu Sakai, Kariya (JP); Toshiharu Mizuno, Kuwana (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 12/346,927

(22) Filed: Dec. 31, 2008

(65) Prior Publication Data
US 2009/0189439 A1    Jul. 30, 2009

(30) Foreign Application Priority Data
Jan. 24, 2008    (JP)    ............... 2008-014306
Dec. 2, 2008    (JP)    ............... 2008-307262

(51) Int. Cl.
B60T 8/36    (2006.01)

(52) U.S. Cl. .................................. 303/119.3

(58) Field of Classification Search ............. 303/116.4, 303/119.2, 119.3; 417/63
See application file for complete search history.

(56) References Cited

U.S. PATENT DOCUMENTS 6,234,199 B1 * 5/2001 Nohira ................... 137/557
6,354,674 B1 * 3/2002 Iwamoto et al. .......... 303/119.3
6,634,723 B1 * 10/2003 Ganzel et al. ............ 303/119.3
2005/0265852 A1 * 12/2005 Nakazawa ................ 417/63
2006/0125314 A1 * 6/2006 Hashiba ................... 303/113.1

FOREIGN PATENT DOCUMENTS

JP    11-208440 A    8/1999
JP    2006-008107 A    1/2006

OTHER PUBLICATIONS

U.S. Appl. No. 12/346,931, filed Dec. 31, 2008, Taizo Abe et al.

* cited by examiner

*Primary Examiner*—Christopher P Schwartz
(74) *Attorney, Agent, or Firm*—Buchanan Ingersoll & Rooney PC (57) ABSTRACT

In a brake hydraulic pressure control device for a vehicle, a plurality of electromagnetic valves are mounted on a first surface of a housing, while an electric motor for driving pumps built in the housing are mounted on a second surface of the first surface. A cover member for covering the electromagnetic valves is attached to the first surface, and a main ECU for controlling the electromagnetic valves and the electric motor is arranged in a space defined by the cover member and the first surface. One or more spaces are formed between the electric motor and the second surface to receive a plurality of pressure sensors for detecting hydraulic pressures at various parts in a hydraulic brake device of the vehicle.

10 Claims, 8 Drawing Sheets

BRAKE HYDRAULIC PRESSURE CONTROL DEVICE

INCORPORATION BY REFERENCE

This application is based on and claims priority under 35 U.S.C. 119 with respect to Japanese Applications No. 2008-014306 and No. 2008-307262 respectively filed on Jan. 24 and Dec. 2, 2008, the entire contents of which are incorporated herein by reference.

BACKGROUND OF THE INVENTION

1. Field of the Invention

The present invention relates to a brake hydraulic pressure control device for use in a brake system for vehicles.

2. Discussion of the Related Art

Heretofore, as brake hydraulic pressure control devices, there has been known one which is described in United States patent application publication No. US 2005/0265852 A1 (equivalent of Japanese unexamined, published patent application No. 2006-008107). As shown in FIGS. 2 and 3 of the publication, in the brake hydraulic pressure control device, an electric motor 50, a shutoff valve 17, a pressure reducing side proportional control valve 18 and a hydraulic pressure sensor (pressure sensor) 19 is concentrically arranged on one surface 30a of a housing 30. In this arrangement, the hydraulic pressure sensor 19 is arranged out of the area for the electric motor 50. In other words, the hydraulic pressure sensor 19 is not arranged between the electric motor 50 and the housing 30.

Also, as brake hydraulic pressure control devices, there has been known another which is described in Japanese unexamined, published patent application No. 11-208440. As shown in FIGS. 1 to 3 of the Japanese application, in the brake hydraulic pressure control device, pressure reducing control valves 1-4, pressure increase control valves 5-8, switching valves 9 and 10, a pressure sensor 21 are provided on one surface of a housing 16, while an electric motor 15 is provided on the other surface opposite to the one surface. The pressure sensor 21 provided there is one only.

In the brake hydraulic pressure control device described in the United States publication, the electric motor 50, the shutoff valve 17, the pressure reducing side proportional control valve 18 and the hydraulic sensor (pressure sensor) 19 are juxtaposed on the same single surface. This configuration requires the surface to be large in area and hence, gives rise to a problem that the housing and hence, the brake hydraulic pressure control device is increased in dimension.

Further, in the brake hydraulic pressure control device described in the Japanese application, the pressure reducing control valves 1-4, the pressure increase control valves 5-8, the switching valves 9 and 10, the pressure sensor 21 are provided on the surface different from the surface mounting the electric motor 15 thereon. This configuration can downsize the housing or the entirety of the device in comparison with the brake hydraulic pressure control device in the United States publication. However, where a plurality of pressure sensors are to be provided, it would become difficult to sufficiently downsize the housing and hence, the entirety of the device.

SUMMARY OF THE INVENTION

Accordingly, it is a primary object of the present invention to provide an improved brake hydraulic pressure control device which can be downsized in a housing and hence, in the entirety thereof.

Briefly, according to the present invention, there is provided an improved brake hydraulic pressure control device for a vehicle, which comprises a housing having a first surface and a second surface different from the first surface; a plurality of electromagnetic valves mounted on the first surface of the housing for regulating hydraulic pressures applied to wheel cylinders for wheels of the vehicle; at least one pump provided in the housing for increasing the hydraulic pressures; an electric motor mounted on the second surface of the housing for driving the at least one pump; and a cover member attached to the first surface of the housing and covering the plurality of electromagnetic valves. The brake hydraulic pressure control device further comprises a first electronic control unit arranged in a space defined by the cover member and the housing for controlling the plurality of electromagnetic valves and the electric motor; and at least one pressure sensor provided in a space defined between the electric motor and the second surface of the housing for detecting at least one of the hydraulic pressures.

In the present invention defined above, the plurality of electromagnetic valves are mounted on the first surface of the housing, the electric motor is mounted on the second surface of the housing, and the at least one pressure sensor is provided in the space formed between the electric motor and the second surface. With this construction, the electric motor and the at least one pressure sensor are not juxtaposed on the same surface, but can be arranged to place one over the other. Accordingly, the area of the first surface can be reduced by concentrating the electromagnetic valves on the first surface, and the area of the second surface can also be reduced by arranging the at least one pressure sensor between the electric motor and the housing, so that it can be realized to downsize the housing and hence, the entirety of the device.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
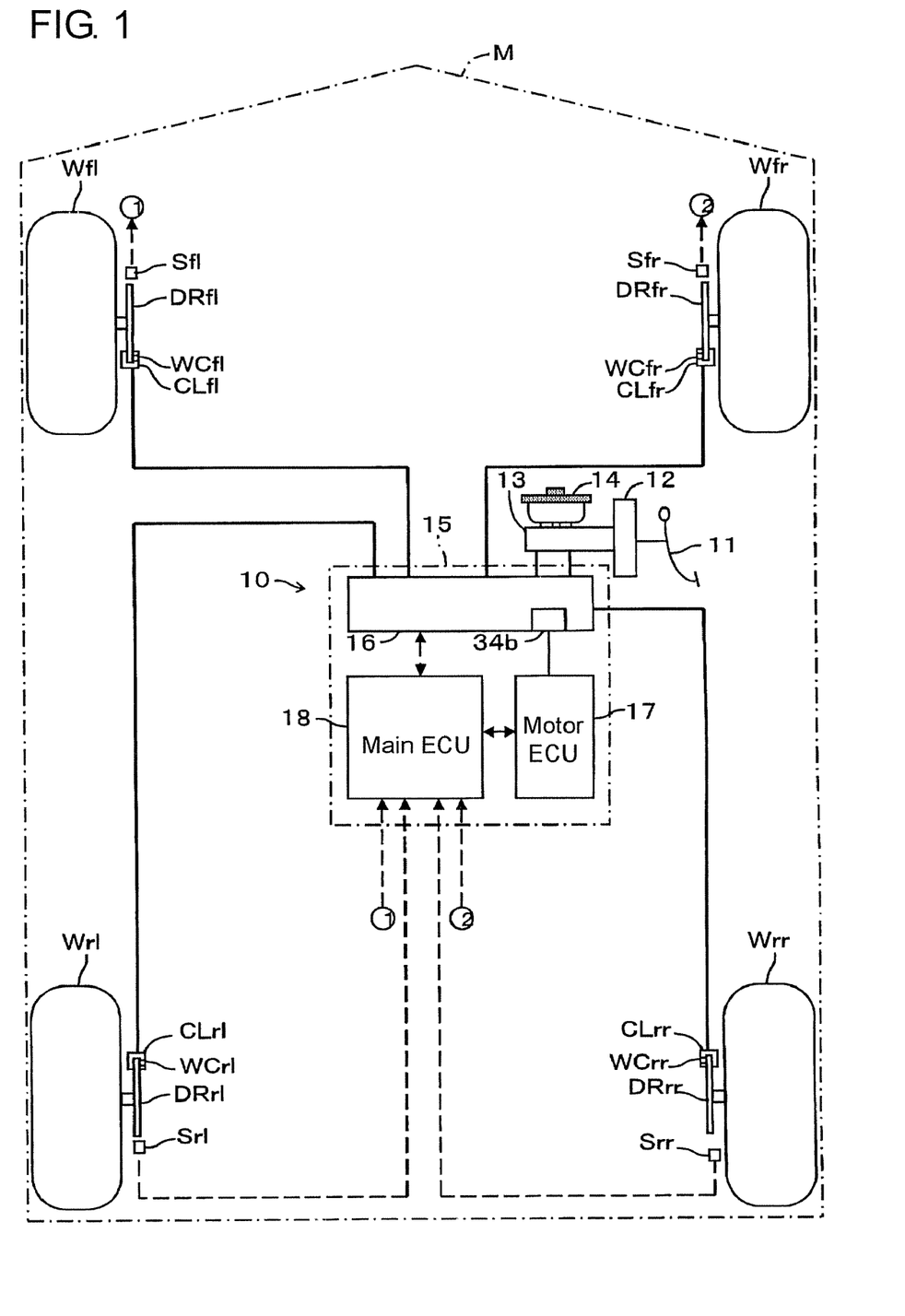
FIG. 1 is a schematic view of a vehicle incorporating a brake hydraulic pressure control device in a first embodiment according to the present invention.
Figure 2A:
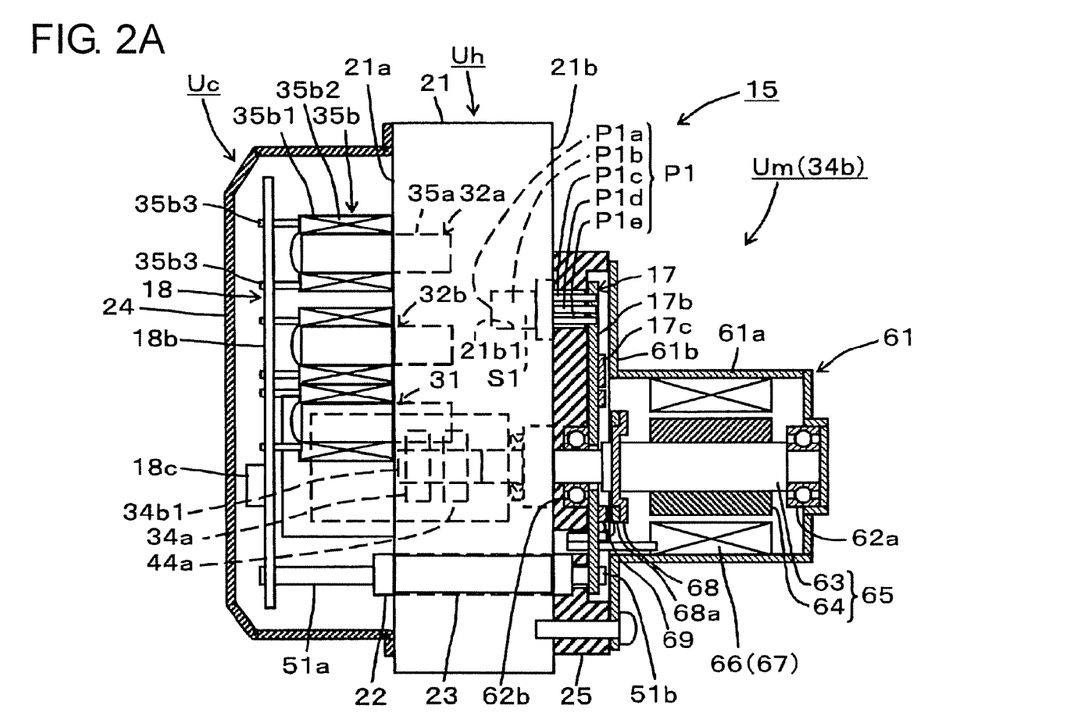
FIG. 2A is a front view, partly in section, of the brake hydraulic pressure control device.
Figure 2B:
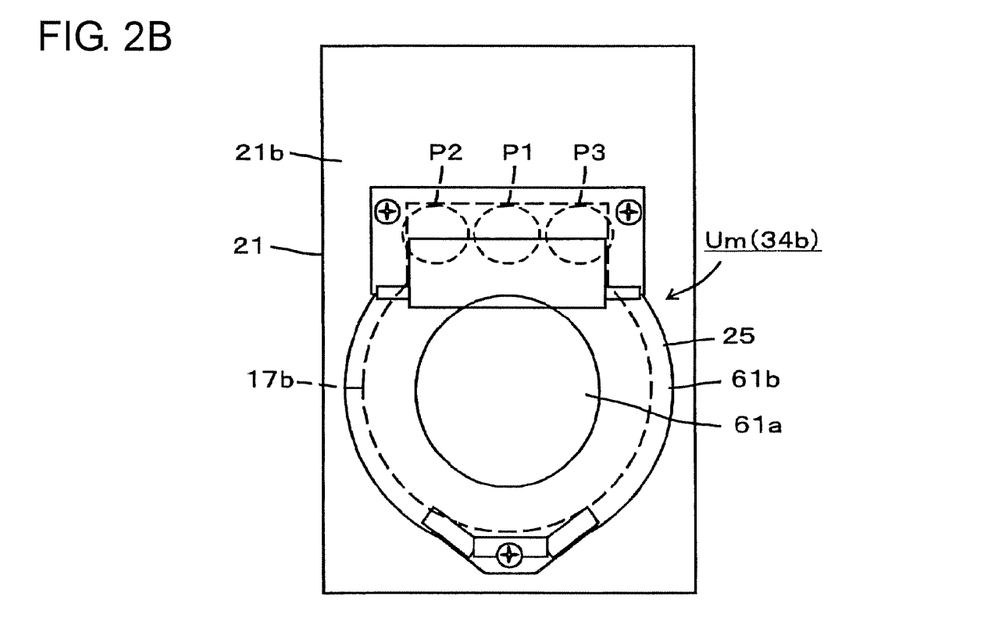
FIG. 2B is a side or bottom view of the brake hydraulic pressure control device.
Figure 3:
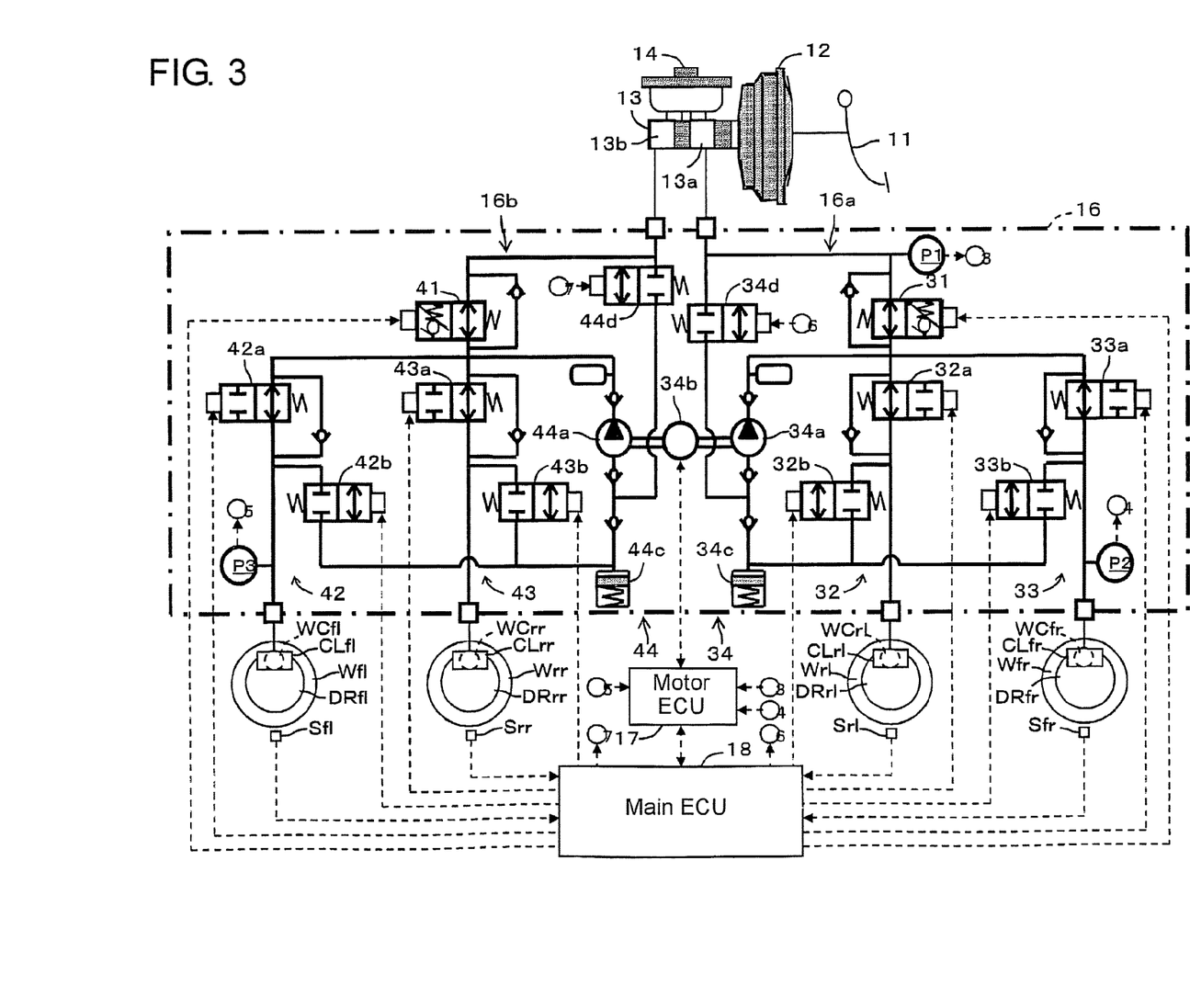
FIG. 3 is a hydraulic circuit diagram of a hydraulic brake device incorporating the brake hydraulic pressure control device.

Hereafter, a vehicle incorporating a brake hydraulic pressure control device in a first embodiment according to the present invention will be described with reference to the accompanying drawings. FIG. 1 is a schematic view showing the construction of a vehicle M, FIGS. 2A and 2B are a front view partly in section and a side view of the brake hydraulic pressure control device 15, and FIG. 3 is a hydraulic circuit diagram showing a hydraulic brake device 10 of the vehicle M.

The hydraulic brake device 10 is for applying hydraulic brake forces to respective wheels Wfl, Wfr, Wrl, Wrr to brake the vehicle M. The hydraulic brake device 10 is provided with wheel cylinders WCfl, WCfr, WCrl, WCrr for respectively restricting rotations of the respective wheels Wfl, Wfr, Wrl, Wrr, a brake pedal 11, and a vacuum booster 12 as boosting device for assisting and boosting (augmenting) a braking manipulation force generated upon the stepping manipulation of the brake pedal 11 by applying an intake vacuum pressure from a combustion engine to a diaphragm thereof (both not shown). The hydraulic brake device 10 is further provided with a master cylinder 13 for generating brake fluids (oils) of a hydraulic pressure (oil pressure) being a base hydraulic pressure which depends on the braking manipulation force boosted by the vacuum booster 12 (i.e., the manipulation state of the brake pedal 11) and for supplying the brake fluids to the wheel cylinders WCfl, WCfr, WCrl, WCrr, a reservoir tank 14 for storing brake fluid to replenish the master cylinder 13 with the brake fluid, and a brake hydraulic pressure control device 15.

The wheel cylinders WCfl, WCfr, WCrl, WCrr are provided in calipers CLfl, CLfr, CLrl, CLrr and receive pairs of pistons (not shown) which are slidably fluid-tightly therein, respectively. When a base hydraulic pressure or a controlled hydraulic pressure is supplied to the wheel cylinders WCfl, WCfr, WCrl, WCrr, the respective pairs of pistons push associated pairs of brake pads (not shown) being friction members and pinch disc rotors DRfl, DRfr, DRrl, DRrr rotating bodily with the wheels Wfl, Wfr, Wrl, Wrr, from both sides thereof to restrict the rotations of the same, respectively. Although disc brakes are used in this particular first embodiment, there may be used drum brakes.

The brake hydraulic pressure control device 15 is provided with a brake actuator 16 composed of respective electromagnetic valves referred to later, pumps 34a, 44a and an electric motor 34b which constitute a plurality of hydraulic devices for individually controlling the hydraulic pressures applied to the respective wheel cylinders WCfl, WCfr, WCrl, WCrr of the vehicle M. The brake hydraulic pressure control device 15 is further provided with a motor ECU (Electronic Control Unit) 17 for controlling the electric motor 34b and a main ECU 18 for performing overall control of the vehicle motion by controlling the electromagnetic valves and by controlling the electric motor 34b through the motor ECU 17.

Next, the construction of the brake hydraulic pressure control device 15 will be described in detail with reference to FIGS. 2A and 2B. The brake hydraulic pressure control device 15 is composed of a housing unit Uh, a cover unit Uc provided on one side surface (e.g., top surface) of the housing unit Uh, and a motor unit Um provided on the other side surface (e.g., bottom surface) of the housing unit Uh. The brake hydraulic pressure control device 15 is a single structure integrating the housing unit Uh, the cover unit Uc and the motor unit Um therein.

The housing unit Uh is provided with a housing 21 taking a generally rectangular form, a plurality of electromagnetic valves 31, 32a, 32b, 33a, 33b, 34d, 41, 42a, 42b, 43a, 43b, 44d, the pumps 34a, 44a, pressure sensors P1, P2, P3, and a connector section 22. FIG. 3 shows all of the electromagnetic valves, the pumps and the pressure sensors, while FIGS. 2A and 2B show some of these devices.

The plurality of electromagnetic valves 31, 32a, 32b, 33a, 33b, 34d, 41, 42a, 42b, 43a, 43b, 44d are for regulating the hydraulic pressures applied to the wheel cylinders WCfl, WCfr, WCrl WCrr and are mounted on a first surface (the aforementioned one side or top surface) 21a of the housing 21.

These electromagnetic valves are of the same construction, which will be described in detail by taking the electromagnetic valve 32a shown in FIG. 2A as an example. The electromagnetic valve 32a is provided with a main body unit 35a attached to the housing 21 and a solenoid unit 35b removably attached to an upper portion of the main body unit 35a. Although not shown, the main body unit 35a is composed mainly of a sleeve secured to the housing 21, a stationary element secured to an upper end of the sleeve, a movable element received in the sleeve to be slidable, and a valve portion provided at a lower end of the sleeve. The solenoid unit 35b is composed mainly of an annular yoke 35b1, a solenoid 35b2 housed in the yoke 35b1, and a pair of terminals (leads) 35b3 upstanding from an upper portion of the yoke 35b1 and connected to the solenoid 35b2. Upper ends of the terminals 35b3 of the solenoid unit 35b are connected directly or indirectly through busbars or the like to the main ECU 18. The yoke 35b1 is removably fitted on the upper part (a portion containing the stationary element) of the main body unit 35a through a through hole (not shown) thereof.

The pumps 34a, 44a are for increasing the hydraulic pressures applied to the wheel cylinders WCfl, WCfr, WCrl, WCrr of the wheels Wfl, Wfr, Wrl, Wrr and are provided in the housing 21.

The pumps 34a, 44a shown in FIG. 2A are rotary pumps such as gear pumps or vane pumps. In the case of gear pumps, for example, each gear pump feeds fluid from a meshing portion of two gears (inner gear and outer gear) received in the housing 21 upon rotations of the gears. The inner gear and the outer gears are rotatably supported with an eccentricity therebetween, and the inner gear is rotationally driven by the electric motor 34b through a rotational shaft 34b1 driven thereby. There may be used piston pumps in substitution for the rotary pumps.

The pressure sensors P1, P2, P3 are for respectively detecting the hydraulic pressure of the master cylinder 13 and the wheel cylinder pressures in first and second systems 16a, 16b and are mounted on a second surface (the aforementioned other side or bottom surface) of the housing 21. The pressure sensors P1, P2, P3 are provided in spaces which are formed between the electric motor 34b (to be more exact, an end plate 25 thereof) and the second surface 21b. As shown in FIG. 2B, the pressure sensors P1, P2, P3 are lapped over the end plate 25 and in other words, are covered by the end plate 25. The second surface 21b is a surface different from the first surface 21a. In this particular first embodiment, the second surface (e.g., bottom surface) 21b is a surface opposite to the first surface (e.g., top surface) 21a.

The pressure sensors P1, P2, P3 are of the same construction, which will be described in detail by taking the pressure sensor P1 as an example. The pressure sensor P1 is provided with a detection section (pressure sensitive section) P1a for detecting the hydraulic pressure of brake fluid in contact with the same and an arithmetic operation section P1b for calculating a hydraulic pressure value from a signal detected by the detection section to output the hydraulic pressure value. The pressure sensor P1 is fitted in an attaching hole 21b1 formed to open on the second surface 21b and is housed in a space S1 defined by the attaching hole 21b1 and the end plate 25. This space S1 is a space defined between the electric motor 34b and the second surface 21b. Respective lead terminals (conductive members) P1c, P1d, P1e of the pressure sensor P1 are connected to the motor ECU 17. The lead terminals P1c, P1d are a power line and a ground line, and the lead terminal P1e is a signal line for transmitting the detection signal. Other pressure sensors P2, P3 have the same construction as the pressure sensor P1.

Next, with reference to FIG. 3, description will be made regarding the construction of the brake actuator 16 which is composed of the aforementioned electromagnetic valves 31, 32a, 32b, 33a, 33b, 34d, 41, 42a, 42b, 43a, 43b, 44d, the pumps 34a, 44a, the pressure sensors P1, P2, P3, and the like.

The brake actuator 16 is composed of plural systems being hydraulic circuits which are operable independently of each other. Specifically, the brake actuator 16 has the first system 16a and the second system 16b arranged in an X or cross piping fashion. The first system 16a connects the first hydraulic chamber 13a of the master cylinder 13 to the wheel cylinders WCrl, WCfr of the left-rear wheel Wrl and the right-front wheel Wfr and undertakes the brake force control for the left-rear wheel Wrl and the right-front wheel Wfr. The second system 16b connects the second hydraulic chamber 13b of the master cylinder 13 to the wheel cylinders WCfl, WCrr of the left-front wheel Wfl and the right-rear wheel Wrr and undertakes the brake force control for the left-front wheel Wfl and the right-rear wheel Wrr. The brake actuator 16 may not be limited to the configuration of an X or cross piping fashion and instead, may take a front rear discrete configuration.

The first system 16a is composed of a differential pressure control electromagnetic valve 31, a left-rear wheel hydraulic pressure control section 32, a right-front wheel hydraulic pressure control section 33 and a first pressure reducing section 34.

The differential pressure control electromagnetic valve 31 is a normally open linear electromagnetic valve which is interposed between the master cylinder 13 and upper streams of the left-rear wheel hydraulic pressure control section 32 and the right-front wheel hydraulic pressure control section 33. The differential pressure control electromagnetic valve 31 is controllable by the main ECU 18 to be switched selectively into a full-open state (the state of no differential pressure) or a differential pressure state. When electrified to be urged toward the differential pressure state (closed side), the differential pressure control electromagnetic valve 31 is able to hold the hydraulic pressure on the wheel cylinders WCrl, WCfr side higher by a predetermined controlled differential pressure than the hydraulic pressure of the master cylinder 13 side. Thus, a controlled hydraulic pressure corresponding to the controlled differential pressure can be made up by the aid of the pressurization by the pump 34a.

The left-rear wheel hydraulic pressure control section 32 is capable of controlling the hydraulic pressure supplied to the wheel cylinder WCrl and is composed of a pressure increase valve 32a being a normally open electromagnetic shutoff valve (electromagnetic valve) of a two-port, two-switchable position type and a pressure reducing valve 32b being a normally closed electromagnetic shutoff valve (electromagnetic valve) of a two-port, two-switchable position type. The pressure increase valve 32a is interposed between the differential pressure control electromagnetic valve 31 and the wheel cylinder WCrl, while the pressure reducing valve 32b is interposed between the wheel cylinder WCrl and a reservoir 34c, so that the hydraulic pressure in the wheel cylinder WCrl can be selectively increased, retained or reduced in accordance with commands from the main ECU 18.

The right-front wheel hydraulic pressure control section 33 is capable of controlling the hydraulic pressure supplied to the wheel cylinder WCfr and, like the left-rear wheel hydraulic pressure control section 32, is composed of a pressure increase valve 33a and a pressure reducing valve 33b. The pressure increase valve 33a and the pressure reducing valve 33b are controllable in response to commands from the main ECU 18, so that the hydraulic pressure in the wheel cylinder WCfr can be selectively increased, retained or reduced.

The first pressure reducing section 34 is composed of the pump 34a for drawing brake fluid in the reservoir 34c to supply the brake fluid between the differential pressure control electromagnetic valve 31 and the pressure increase valves 32a, 33a, the electric motor 34b for driving the pump 34a, the reservoir 34c capable of temporarily storing the brake fluid drained from the wheel cylinders WCrl, WCfr through the pressure reducing valves 32a, 33b, and an electromagnetic valve 34d for selectively bringing the reservoir 34c into communication with the master cylinder 13 and blocking from the same. The electromagnetic valve 34d is a normally closed electromagnetic shutoff valve (electromagnetic valve). The electromagnetic valve 34d is an inflow control valve and, when replenishing the operating fluid from the master cylinder 13 to the reservoir 34c is necessary, is brought into an open state by being excited to permit the flow of the operating fluid from the master cylinder 13 to the reservoir 34c. When replenishing the operating fluid from the master cylinder 13 to the reservoir 34c is unnecessary, on the contrary, the electromagnetic valve 34d remains in a closed state without being excited to block the flow of the operating fluid from the master cylinder 13 to the reservoir 34c, so that the pressure increase by the master cylinder 13 can be done.

The first pressure reducing section 34 is capable of supplying the brake fluid supplied from the master cylinder 13 to the upper streams of the pressure increase valves 32a, 33a by way of the electronic magnetic valve 34d and the reservoir 34c while the pump 34a is being driven with the differential pressure control electromagnetic valve 31 making the differential pressure state (for example, in the case of a side-slip prevention control, a traction control or the like).

Like the first system 16a, the second system 16b is composed of a differential pressure control electromagnetic valve 41, a left-front wheel hydraulic pressure control section 42, a right-rear wheel hydraulic pressure control section 43 and a second pressure reducing section 44. The left-front wheel hydraulic pressure control section 42 and the right-rear wheel hydraulic pressure control section 43 are capable of respectively controlling the hydraulic pressures supplied to the wheel cylinders WCfl, WCrr and, like the left-rear wheel hydraulic pressure control section 32 and the right-front wheel hydraulic pressure control section 33, are composed respectively of a pressure increase valve 42a, a pressure reducing valve 42b and a pressure increase valve 43a and a pressure reducing valve 43b. Like the first pressure reducing section 34, the second pressure reducing section 44 is composed of the pump 44a, the electric motor 34b used in common to the first pressure reducing section 34, a reservoir 44c and an electromagnetic valve 44d.

In the brake actuator 16 as constructed above, at the time of an ordinary braking operation, all of the electromagnetic valves are held in a deenergized state, so that a brake hydraulic pressure or a base hydraulic pressure corresponding to the manipulation force of the brake pedal 11 can be supplied to the wheel cylinders WC. It is to be noted that symbols "" are suffixes corresponding to one of the wheels and denote any of symbols "fl, fr, rl and rr" which respectively represent left-front, right-front, left-rear and right-rear. These symbols are used in the same meanings throughout the present description and the accompanying drawings.

Further, when the differential pressure control electromagnetic valves 31, 41 are energized with the electric motor 34b and hence, the pumps 34a, 44a being driven, it becomes possible to supply the wheel cylinder WC** with a brake hydraulic pressure which is made up by adding the controlled hydraulic pressure to the base hydraulic pressure from the master cylinder 13.

Further, the brake actuator 16 is capable of individually adjusting the hydraulic pressures in the respective wheel cylinders WC** by controlling the pressure increase valves 32a, 33a, 42a, 43a and the pressure reducing valves 32b, 33b, 42b, 43b. Thus, it becomes possible to perform various well-known controls such as, for example, anti-skid control, front-rear brake force distribution control, side-slip prevention control (specifically, understeer suppression control and oversteer suppression control), traction control, vehicle-to-vehicle distance control or the like.

The brake actuator 16 is further provided with the pressure sensor P1 for detecting a master cylinder pressure being the brake hydraulic pressure in the master cylinder 13, and a detection signal therefrom is outputted to the motor ECU 17. The pressure sensor P1 is provided at the upper stream (the master cylinder 13 side) of the differential pressure control electromagnetic valve 31 in the first system 16a.

The brake actuator 16 is further provided with the pressure sensor P2 for detecting a wheel cylinder pressure being the brake hydraulic pressure in the wheel cylinder WCfr of the first system 16a, and a detection signal therefrom is outputted to the motor ECU 17. The pressure sensor P2 is provided at the lower streams of the pressure increase valve 33a and the pressure reducing valve 33a (i.e., on the wheel cylinder WCfr side) in the first system 16a. The pressure sensor P2 may be connected not to detect the hydraulic pressure of the wheel cylinder WCfr, but to detect the hydraulic pressure of the wheel cylinder WCrl.

The brake actuator 16 is further provided with the pressure sensor P3 for detecting a wheel cylinder pressure being the brake hydraulic pressure of the wheel cylinder WCfl in the second system 16b, and a detection signal therefrom is outputted to the motor ECU 17. The pressure sensor P3 is provided at the lower streams of the pressure increase valve 42a and the pressure reducing valve 42b (i.e., on the wheel cylinder WCfl side) in the second system 16b. The pressure sensor P3 may be connected not to detect the hydraulic pressure of the wheel cylinder WCfl, but to detect the hydraulic pressure of the wheel cylinder WCrr. The pressure sensors P2 and P3 may be arranged respectively on the upper stream side of the pressure increase valves 32a, 33a (i.e., on the lower stream side of the differential pressure control electromagnetic valve 31) and on the upper stream side of the pressure increase valves 42a, 43a (i.e., on the lower stream side of the differential pressure control electromagnetic valve 41).

Referring back again to the housing unit Uh, the connector section 22 will be described with reference to FIGS. 2A, 4 and 5 The connector section 22 provides detachable connection between the main CPU 18 and the motor ECU 17, that is, between a plurality of conductive members 51a-55a connected to the main ECU 18 and a plurality of conductive members 51b-55b connected to the motor ECU 17. The connector section 22 is provided with a connector section housing 22a made of an insulating material such as, e.g., a resin material and a plurality of connection terminals (e.g., contacts) 22b1-22b5 housed in an insulated state respectively within a plurality of compartments (not shown) which are formed to be partitioned in the connector section housing 22a. The connector section 22 in this particular embodiment is constituted by a single unit though illustrated as two in FIG. 4. In a modified form, two or more connector sections may be used instead of the single connector section 22.

The respective connection terminals 22b1-22b5 are provided with respective fixing portions (not shown) to which the conductive members 51b-55b connected to the motor ECU 17 are fixedly connected by, e.g., crimping The conductive members 51b, 52b are two conductive members for motor drive power supply which supply the electric motor 34b with an external power voltage (+BM) through the main ECU 18. The conductive members 51b, 52b are fixedly connected by, e.g., soldering at respective one ends thereof to the respective fixing portions of the connection terminals 22b1, 22b2 and at respective other ends thereof to respective terminals 17a1, 17a2 (copper foil terminals) of a motor drive power line L1 and a ground line L2 which are formed on the motor ECU 17 for power supply to the electric motor 34b. Where the electric motor 34b is a direct current brushless motor, one of the conductive members 51b for motor drive power supply constitutes the power supply line L1, while the other conductive member 52b for motor drive power supply constitutes the ground line L2.

The conductive member 53b is an IC (Integrated Circuit) drive power supply conductive member for supplying another external power voltage (IG voltage of, e.g., 13.5 volts) to a power supply circuit 17i for a second CPU 17c and a pre-driver 17d through the main ECU 18. The conductive member 53b is fixedly connected by, e.g., soldering at one end thereof to the fixing portion of the connection terminal 22b3 and at the other end thereof to the terminal (copper foil terminal) 17a3 of an IC drive power line L3 which terminal is formed on the motor ECU 17 for power supply to the second CPU 17c and the pre-driver 17d.

The conductive member 54b constitutes a first signal conductive member for transmitting serial signals (serial data) from a first CPU 18c of the main ECU 18 to the second CPU 17c of the motor ECU 17. The conductive member 54b is secured by, e.g., soldering at one end thereof to the fixing portion of the connection terminal 22b4 and at the other end thereof to a terminal (copper foil terminal) 17a4 of a first signal line L4 which is formed on the motor ECU 17 and which is connected to the second CPU 17c.

The conductive member 55b constitutes a second signal conductive member for receiving serial signals (serial data) which is transmitted from the second CPU 17c of the motor ECU 17 to the first CPU 18c of the main ECU 18. The conductive member 55b is secured by, e.g., soldering at one end thereof to the fixing portion of the connection terminal 22b5 and at the other end thereof to a terminal (copper foil terminal) 17a5 of a second signal line L5 which is formed on the motor ECU 17 and which is connected to the second CPU 17c.

Each of the conductive members 51b-55b may be made to a fine wire of a single line or may be made with a stranded wire and may be coated with an insulating material. For example, it may be formed by a lead line or a busbar.

Further, the respective connection terminals 22b1-22b5 are provided with detachable portions (not shown), to which detachably connected are the lead terminals (conductive members) 51a-55a connected to the main ECU 18, respectively. Respective base ends of the lead terminals 51a, 52a are fixedly connected by, e.g., soldering to respective terminals (copper foil terminals) 18a1, 18a2 of a motor drive power line L11 and a ground line L12 which are formed on the main ECU 18 for supplying the power voltage (+BM) to the electric motor 34b. Respective extreme ends of the lead terminals 51a, 52a are detachably inserted into the respective detachable portions of the connection terminals 22b1, 22b2.

A base end of the lead terminal 53a is fixedly connected by, e.g., soldering to a terminal (copper foil terminal) 18a3 of the IC drive power supply line L13 which is formed on the main ECU 18 to be supplied with the external power voltage (IG voltage). An extreme end of the lead terminal 53a is detachably inserted into the detachable portion of the connection terminal 22b3.

A base end of the lead terminal 54a is fixedly connected by, e.g., soldering to a terminal (copper foil terminal) 18a4 of a first signal line L14 which is formed on the main ECU 18 for transmitting serial signal (serial data) from the first CPU 18c of the main ECU 18 to the second CPU 17c of the motor ECU 17. An extreme end of the lead terminal 54a is detachably inserted into the detachable portion of the connection terminal 22b4.

A base end of the lead terminal 55a is fixedly connected by, e.g., soldering to a terminal (copper foil terminal) 18a5 of a second signal line L15 which is formed on the main ECU 18 for enabling the first CPU 18c of the main ECU 18 to receive serial signal (serial data) from the second CPU 17c of the motor ECU 17. An extreme end of the lead terminal 55a is detachably inserted into the detachable portion of the connection terminal 22b5.

As shown in FIG. 2A, a sleeve member 23 formed with an insulating member (e.g., resin material) is connected at one end to the connector section 22. The sleeve member 23 passes through the housing 21 to extend beyond the second surface 21b. The aforementioned respective conductive members 51b-55b are provided to extend in the sleeve member 23 and are connected at respective other ends thereof to the aforementioned respective terminals 17a1-17a5 (refer to FIG. 5) of the motor ECU 17. Instead of providing the sleeve member 23, a modification may be made to provide a through hole in the housing 21. In this modification, the connector section 22 may be provided at the end on the first surface 21a side of the through hole, and the conductive members each coated with an insulating material may be arranged to pass through the through hole.

As shown in FIG. 2A, the cover unit (the first unit) Uc is composed of the main ECU 18 and a cover member 24. The cover member 24 covers the aforementioned plurality of electromagnetic valves and is detachably attached to the first surface 21a. For example, the cover member 24 is secured to the housing 21 by means of screws (not shown). The main ECU 18 is supported and secured to the cover member 24 through support poles (now shown). The main ECU 18 is arranged in a space defined by the cover member 24 and the housing 21.

The main ECU 18 constitutes first control means for controlling the aforementioned plurality of electromagnetic valves and the electric motor 34b. As shown in FIGS. 2A, 4 and 5, the main ECU 18 is provided with the first CPU 18c mounted on a printed board 18b and a noise filter 18d mounted on the printed board 18b or arranged on a busbar on the cover member (case) 24. The first CPU 18c, the noise filter 18d and the aforementioned respective terminals are connected with a copper foil pattern completing designed circuit connections.

The first CPU 18c is constituted by a microcomputer. The first CPU 18c executes the brake control for the hydraulic brake device 10, the derivation of a target rotational speed of the electric motor 34b, the transmission of the target rotational speed of the electric motor 34b to the second CPU 17c, and outputting (displaying on a display unit) abnormality information on the aforementioned plurality of electromagnetic valves, the electric motor 34b and the pressure sensors P1-P3.

The first CPU 18c is provided with a first converter 18c1 which is capable of converting serial signals or parallel signals selectively inputted therein into the parallel signals or serial signals and of outputting the converted signals. The first converter 18c1 and a second converter 17c1 referred to later are connected with each other through a single electrically conductive member which is constituted by the first signal line L14, the lead terminal 54a, the conductive member 54b and the first signal line L4, so that serial communication is possible from the first CPU 18c to the second CPU 17c. The first converter 18c1 and the second converter 17c1 referred to later are connected with each other through another single electrically conductive member which is constituted by the second signal line L15, the lead terminal 55a, the conductive member 55b and the second signal line L5, so that serial communication is possible from the second CPU 17c to the first CPU 18c.

The noise filter 18d is an electric circuit composed of coils and condensers and eliminates noises of the power voltage (+BM).

As shown in FIG. 2A, the motor unit (second unit) Um is composed of the electric motor 34b being a brushless motor and the motor ECU (electronic control unit) 17 being second control means for driving the electric motor 34b. The motor unit Um in this particular embodiment is of the type that incorporates the motor ECU 17 in the electric motor 34b, and therefore, is taken as the electric motor 34b itself in appearance. As the motor unit, there may be used one wherein the motor ECU 17 is attached externally of the electric motor 34b.

Figure 4:
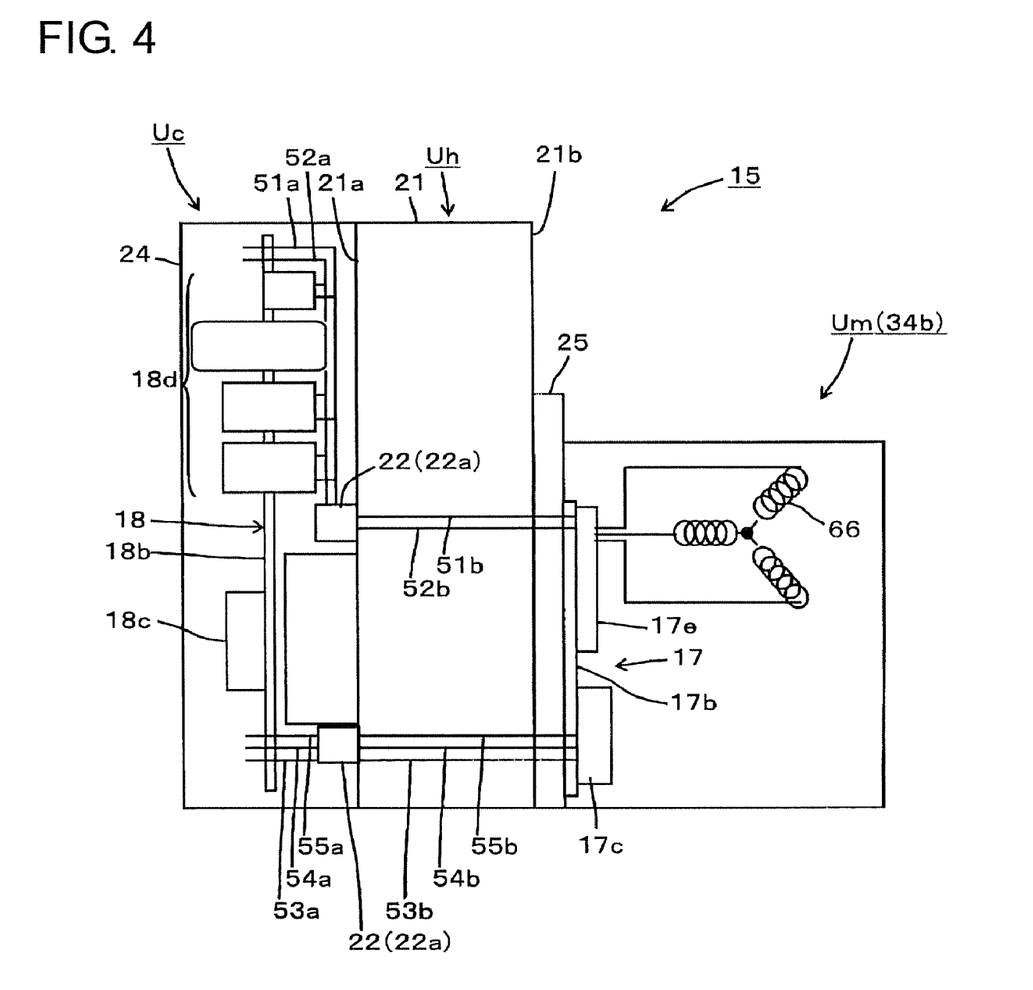
FIG. 4 is a schematic view of the brake hydraulic pressure control device, showing electric connections.

As shown mainly in FIGS. 2A and 4, the electric motor 34b is attached to the second surface 21b of the housing 21 which surface 21b is different from, and opposite to, the first surface 21a of the housing 21.

The electric motor 34b is constituted by, e.g., a three-phase synchronous brushless motor incorporating permanent magnets therein. The electric motor 34b is desired to be a brushless motor, but is not limited to a three-phase synchronous brushless motor. The electric motor 34b is provided with a motor cover or casing 61. The motor casing 61 is provided with a bottomed cylindrical portion 61a and a flange portion 61b which is connected to an opening circumferential edge of the bottomed cylindrical portion 61a. In the bottomed cylindrical portion 61a, a rotary spindle 63 which is rotatably supported by a bearing 62a and another bearing 62b fitted in a heat sink 25 is arranged along the axis of the bottomed cylindrical portion 61a. Motor drive permanent magnets 64 are secured to the circumferential surface of the rotary spindle 63. The permanent magnets 64 have S-poles and N-poles which are alternately magnetized at equiangular intervals in the circumferential direction. The rotary spindle 63 and the permanent magnets 64 constitute a rotor 65.

Three-phase coils 66 each configured to take a circular arc form in cross-section are arranged on and along an internal wall surface of the bottomed cylindrical portion 61a. The coils 66 are arranged to encircle the permanent magnets 64. The coils 66 are wound around respective cores (not shown). The coils 66 and the cores constitute a stator 67.

An extreme end of the rotary spindle 63 extends into the housing 21 and is coupled to be rotatable bodily with the pumps 34a, 44a.

A disc 68 rotating together with the rotary spindle 63 is secured on the extreme end side of the rotary spindle 63. The disc 68 has secured thereto a ring-shape permanent magnet 68a for phase detection, on which like the permanent magnets 64, S-poles and N-poles are alternately magnetized at equiangular intervals in the circumferential direction.

In the motor casing 61, a printed board 17b is arranged to be close to the permanent magnet 68a, and a rotation sensor 69 for phase detection which comprises, for example, Hall elements or the like are secured to the printed board 17b in face-to-face relation with the permanent magnet 68a. Actually, the rotation sensor 69 includes three sensor elements, which are provided at equiangular intervals in the circumferential direction in correspondence to the number of phases of the coils 66.

Thus, the rotational position of the rotor 65 is distinguished by utilizing the rotation sensor 69 whose output changes in dependence on the magnetic pole of the permanent magnet 68a facing the rotor 65, and an inverter circuit 17e responding to the detected rotational position supplies suitable electric current to the coils 66 to switch the exciting state of the coils 66, whereby the rotor 65 is rotated to output rotational output from the electric motor 34b.

Figure 5:
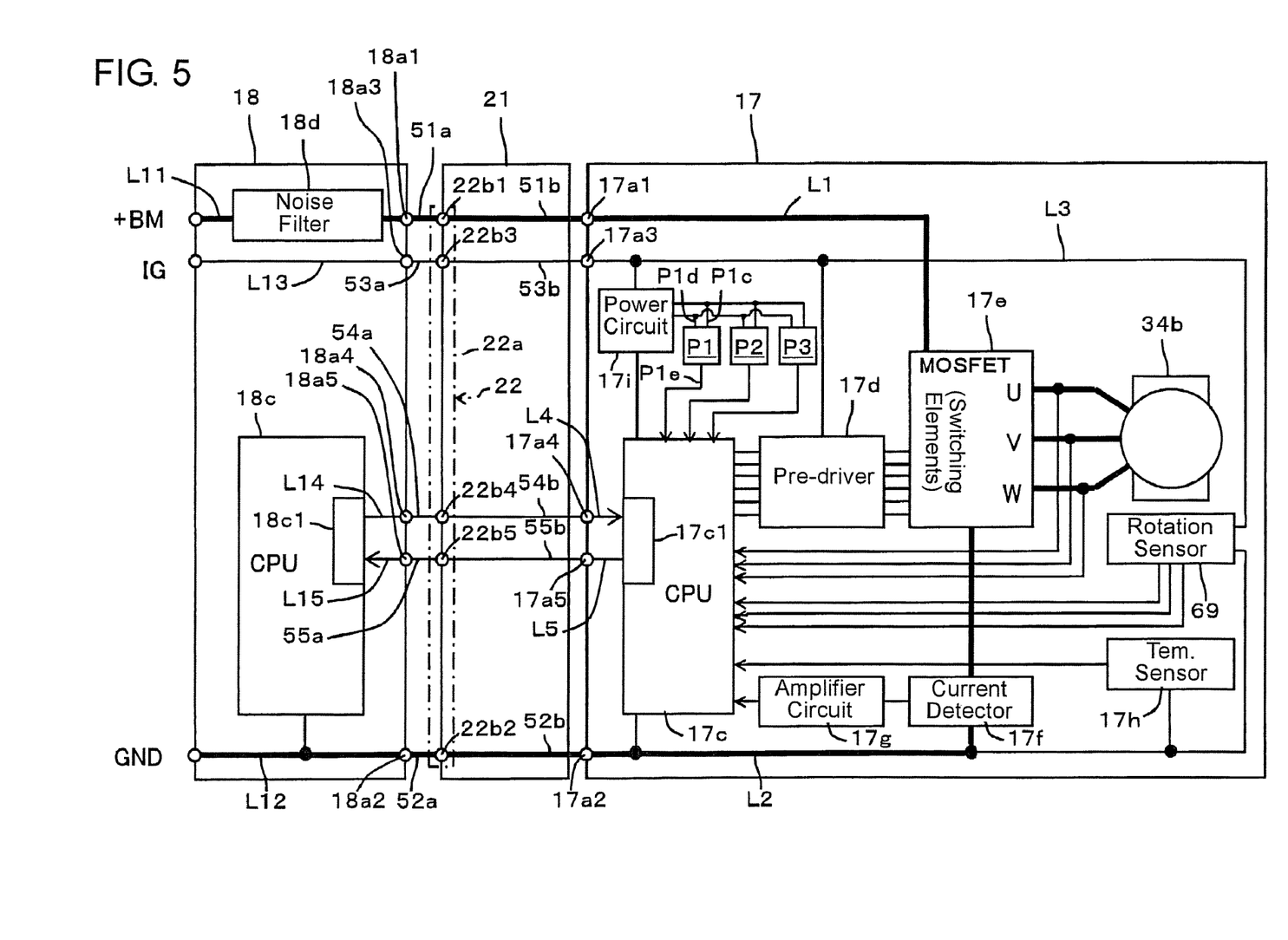
FIG. 5 is a block diagram showing the schematic constructions of a main ECU and a motor ECU shown in FIG. 1.

As shown mainly in FIG. 5, the motor ECU 17 is provided with the second CPU 17c, the pre-driver (gate drive circuit) 17d, the inverter circuit 17e, the power supply circuit 17i, a current detection sensor 17f, an amplifier circuit 17g and a temperature sensor 17h which are all mounted on the printed board 17b.

The second CPU 17c is constituted by a microcomputer. The second CPU 17c is responsive to position information from the rotation sensor 69 and performs drive switching of the inverter circuit 17e, calculation for the rotational speed of the electric motor 34b, feedback control of the electric motor 34b in dependence on the calculated rotational speed, monitoring and abnormality detections for output voltages (output voltages of respective phases) and currents, abnormality detection of the rotational sensor, overheat monitoring and protection, and transmissions of the rotational speed, abnormality signals and the like to the first CPU 18c.

The second CPU 17c is provided with the second converter 17c1 which is capable of converting either serial signals or parallel signals inputted thereto into corresponding parallel signals or serial signals and of outputting the converted signals.

The second CPU 17c receives a target rotational speed of the electric motor 34b from the first CPU 18c, calculates control values to attain the received target rotational speed, and transmits to the pre-driver (drive means) 17d motor control signals which are calculated based on the control values for controlling the electric motor 34b.

Figure 6:
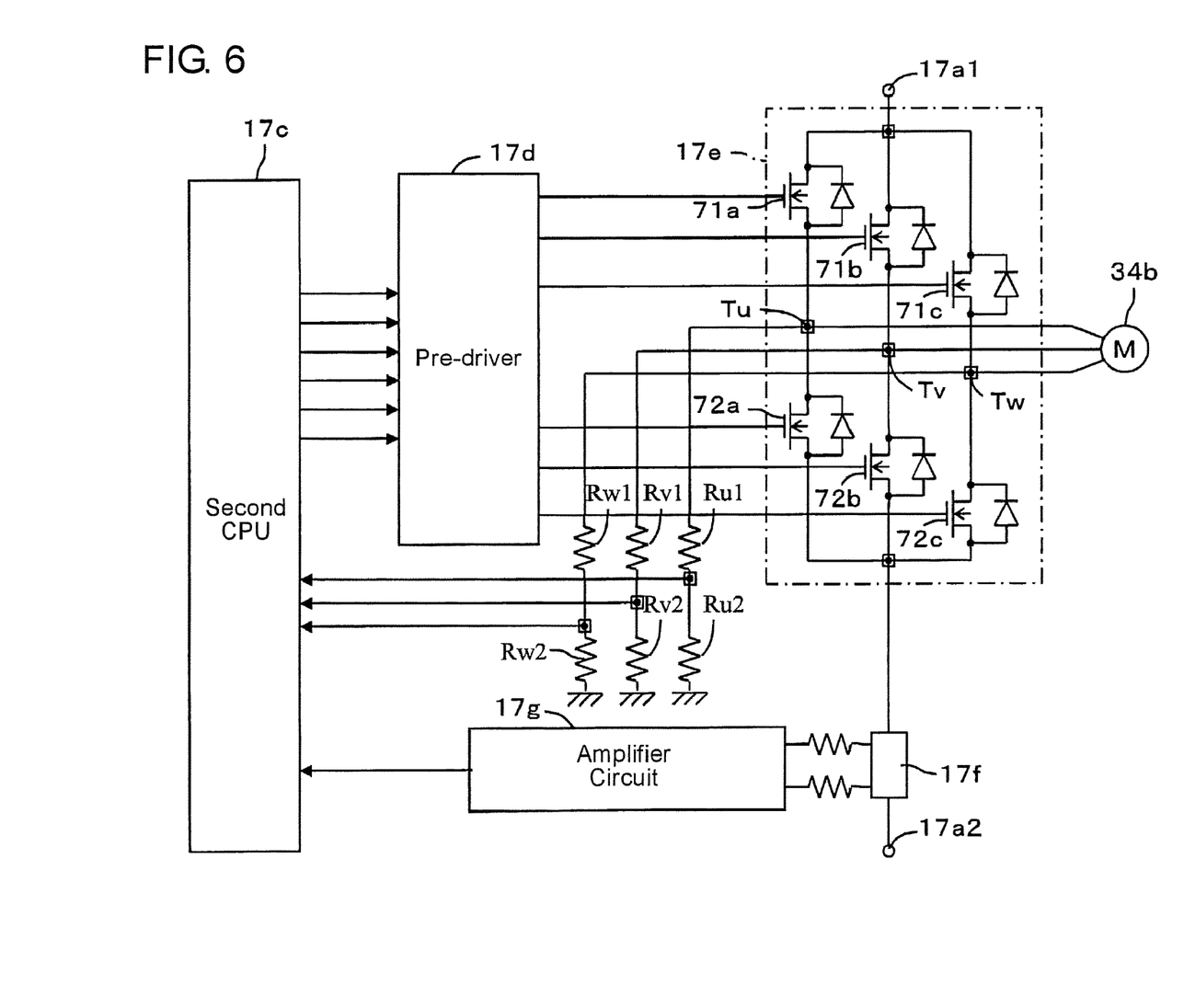
FIG. 6 is a block diagram showing a second CPU, a pre-driver and an inverter circuit in FIG. 5.

As specifically shown in FIG. 6, the pre-driver 17d transmits to the inverter circuit 17e ON/OFF control signals which control ON/OFF operations of switching elements 71a-71c, 72a-72c. The pre-driver 17d boosts the outputs of "high" signals for driving the switching elements 71a-71c, 72a-72c.

The inverter circuit 17e is provided with the upper-stage switching elements 71a-71c and the lower-stage switching elements 72a-72c. Each of these switching elements 71a-71c, 72a-72c is constituted by, for example, a MOSFET (Metal-Oxide Semiconductor Field-Effect Transistor). The upper switching elements 71a-71c are connected at drains thereof to the motor drive power supply through the terminal 17a1, at gates thereof to the pre-driver 17d and at sources thereof respectively to drains of the lower-stage switching elements 72a-72c. The lower-stage switching elements 72a-72c are connected at gates thereof to the pre-driver 17d and are grounded at sources thereof through the current detection sensor 17f (e.g., shunt resistance) and the terminal 17a2.

Respective mid-points Tu, Tv, Tw between the upper-stage switching elements 71a-71c and the lower-stage switching elements 72a-72c are connected to the coils 66 in the U-phase, V-phase and W-phase (not shown) of the electric motor 34b. The respective mid-points Tu, Tv, Tw are grounded through first resistances Ru1, Rv1, Rw1 and second resistances Ru2, Rv2, Rw2, respectively. The second CPU 17c has inputted thereto the voltages between the first and second resistances Ru1, Ru2 for the U-phase, between the first and second resistances Rv1, Rv2 for the V-phase and between the first and second resistances Rw1, Rw2 for the W-phase, that is, the divided voltages from the motor terminal voltages for the U-phase, V-phase and W-phase. The amplifier circuit (power current detection circuit) 17g connected to the current detection sensor 17f detects a current value applied to the electric motor 34b by amplifying and detecting the value of a voltage across the current detection sensor 17f and outputs the detection result to the second CPU 17c.

The switching elements 71a-71c, 72a-72c rise in temperature by being repetitively switched (i.e., turned into ON/OFF states) during the driving of the electric motor 34b. To suppress this, the inverter circuit 17e which comprises the upper and lower stage switching elements 71a-71c, 72a-72c mounted on the board 17b is secured in close contact to the heat sink 25 secured to the second surface 21b of the housing 21, as shown in FIG. 4, so that the heat sink 25 can radiate heat from the inverter circuit 17e. As shown in FIG. 2A, the flange portion 61b of the motor casing 61 is attached to the heat sink 25 in contact with the same, and thus, the heat sink 25 also serves as the aforementioned end plate closing the opening end portion of the motor casing 61.

As described above, the electric motor 34b is composed of the aforementioned motor casing 61, the heat sink 25, the bearings 62a, 62b, the rotary spindle 63, the permanent magnets 64, the coils 66, the disc 68, the permanent magnet 68a and the rotation sensor 69.

The temperature sensor 17h is for detecting the temperature of the inverter circuit 17e (composed of the aforementioned switching elements) and is constituted by, for example, a thermistor. A detection signal from the temperature sensor 17h is outputted to the second CPU 17c.

Further, the pressure sensors P1-P3 are connected to the second CPU 17c to output their detection signals to the second CPU 17c. These detection signals are further transmitted from the second CPU 17c through the conductive member 55b to the first CPU 18c.

The second CPU 17c is supplied with a voltage (e.g., 5 volts) to which the IG voltage on the IC drive power supply line L3 is stepped down through the power supply circuit 17i. The voltage formed by the power supply circuit 17i is supplied to the pressure sensors P1-P3.

Additionally, as shown in FIGS. 1 and 3, the hydraulic brake device 10 is provided with wheel speed sensors Sfl, Sfr, Srl, Srr for respectively detecting the rotational speeds of the respective wheels Wfl, Wfr, Wrl, Wrr of the vehicle M. The wheel speed sensors Sfl, Sfr, Srl, Srr are provided by the associated wheels Wfl, Wfr, Wrl, Wrr and output to the main ECU 18 signals (detection signals) of the frequencies corresponding to the rotational speeds of the associated wheels Wfl, Wfr, Wrl, Wrr, respectively.

As is clear from the foregoing description, in the first embodiment, the plurality of electromagnetic valves 31, 32a, 32b, 33a, 33b, 34d, 41, 42a, 42b, 43a, 43b, 44d are mounted on the first surface 21a of the housing 21, while the electric motor 34b and the pressure sensors P1-P3 are mounted on the second surface 21b of the housing 21. As best shown in FIGS. 2A and 2B, the pressure sensors P1-P3 are arranged in the spaces S1 which are defined by the electric motor 34 and the second surface 21b. Thus, the electric motor 34b and the pressure sensors P1-P3 are not juxtaposed on the same surface, but can be arranged to place one over the other (i.e., to be lapped on each other), so that they occupy the same or common area. Accordingly, the area of the first surface 21a can be reduced by concentrating the electromagnetic valves 31, 32a, 32b, 33a, 33b, 34d, 41, 42a, 42b, 43a, 43b, 44d on the first surface 21a, and the area of the second surface 21b can also be reduced by arranging the pressure sensors P1-P3 between the electric motor 34b and the housing 21. As a consequence, it can be realized to downsize the housing 21 and hence, the entirety of the device.

Further, in the present embodiment which uses a brushless motor as the electric motor 34b, the motor ECU 17 capable of communicating with the main ECU 18 is further provided for driving the electric motor 34b, and lead wires connected to the pressure sensors P1-P3 (for example, conductive members P1c-P1e where the pressure sensor P1 is typically referred to) are electrically connected to the motor ECU 17. The pressure sensors P1-P3 are connected to be able to transmit the output signals therefrom to the main CPU 18 through the motor ECU 17. With this construction, it becomes possible to connect, by transmission, the pressure sensors P1-P3 to the main ECU 18 by utilizing the communication line between the main ECU 18 and the motor ECU 17. This precludes the provision of any dedicated transmission lines for pressure signals, so that an increase in dimension of the device main body can be suppressed.

Furthermore, between the cover unit (first unit) Uc and the motor unit (second unit) Um, the conductive members 54b, 55b capable of serial communication are wired to connect the first converter 18c1 provided in the first unit Uc with the second converter 17c1 provided in the second unit Um. That is, the main ECU 18 and the motor ECU 17 are connected with each other through the conductive members 54b, 55b which are capable of performing serial communication. With this construction, the conductive members (i.e., the conductive members connecting the main ECU 18 with the motor ECU 17) can be reduced in number in comparison with those used in other methods (e.g., relying on parallel communication) than serial communication. This construction advantageously works together with the constructions that enable the terminals or lead wires of the electromagnetic valves to be connected directly to the main ECU (first control means) 18 and that enable the terminals or lead wires of the brushless motor to be connected directly to the motor ECU (second control means) 17. As a consequence, it can be realized to reduce the number of the conductive members arranged in the brake hydraulic pressure control device 15 and hence, to reduce the space for the wiring of the conductive members, so that the device can be downsized as a whole.

In addition, the second surface 21b of the housing 21 is on the side opposite to the first surface 21a. If the second surface 21b were a surface next to the first surface 21a, the electric motor would be attached to one side surface (the second surface) of the housing which mounts the electromagnetic valves on the top surface (the first surface). In this case, the brake hydraulic pressure control device would unavoidably be elongated along the surface including the first surface and would have to take the form of a rectangular parallelepiped which is long in one direction of three mutually orthogonal directions. Where the second surface 21b is on the side opposite to the first surface 21a as is the case of the present embodiment, on the contrary, the electric motor 34b can be attached to the bottom surface (second surface) 21b of the housing 21 which mounts the electromagnetic valves on the top surface (first surface) 21a. In this case, the brake hydraulic pressure control device 15 becomes elongated in a direction (the left-right direction as viewed in FIG. 2A) normal to the first surface 21a, but can suppress the differences between the respective lengths in three mutually orthogonal directions.

Although in the foregoing first embodiment, each of the pressure sensors packages within a single casing a sensor chip being a detection section (pressure sensitive section) and an arithmetic processing IC (Integrated Circuit) being an arithmetic operation section, there may be used pressure sensors of the construction that separates the detection section from the arithmetic operation section.

Figure 7:
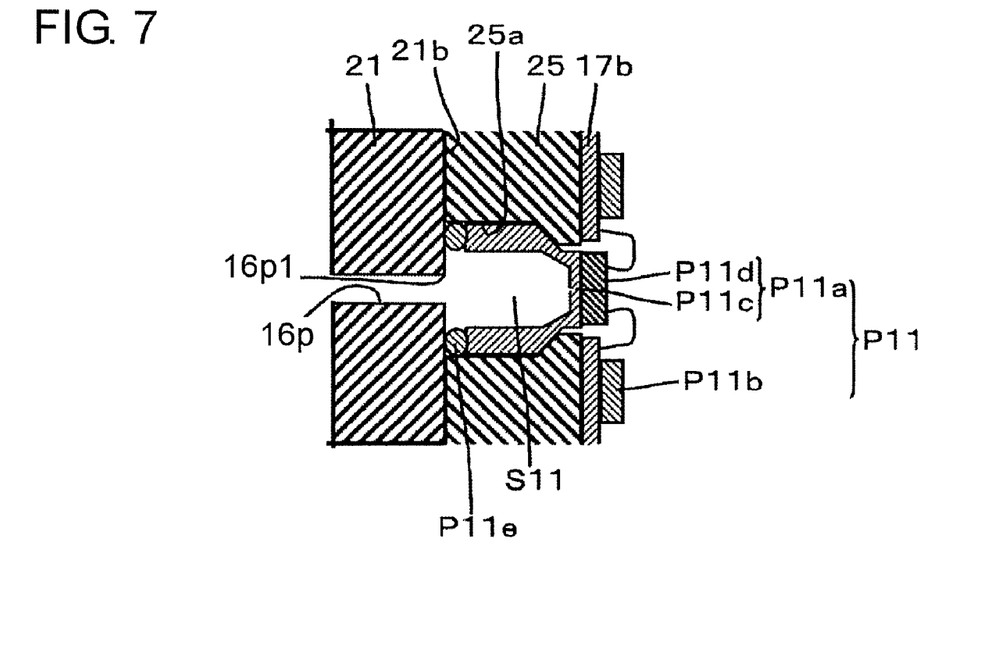
FIG. 7 is an enlarged sectional view showing a first modified form of a pressure sensor shown in FIG. 2.

FIG. 7 shows a pressure sensor in a first modified form. The pressure sensor designated as P11 in the first modified form comprises a detection section P11a and an arithmetic operation section P11b. The detection section P11a is provided with a cup-shape stem P11c made of an elastic material and a sensor chip P11d. The stem P11c covers an opening 16p1 of an oil passage 16p, and brake fluid is filled up in the stem P11c. The chip sensor P11d is secured to an outward wall of a bottom portion of the stem P11c in contact with the outward wall. The stem P11c is received in a stepped attaching hole 25a formed in the end plate 25. A stepped portion of the attaching hole 25a prevents the stem P11c from coming out. A seal member (O-ring) P11e is interposed between an opening end surface of the stem P11c and the second surface 21b. The arithmetic operation section P11b is an arithmetic processing IC mounted on the printed board 17b. The arithmetic operation section P11b processes a signal inputted from the sensor chip P11d to calculate a pressure value.

Figure 8:
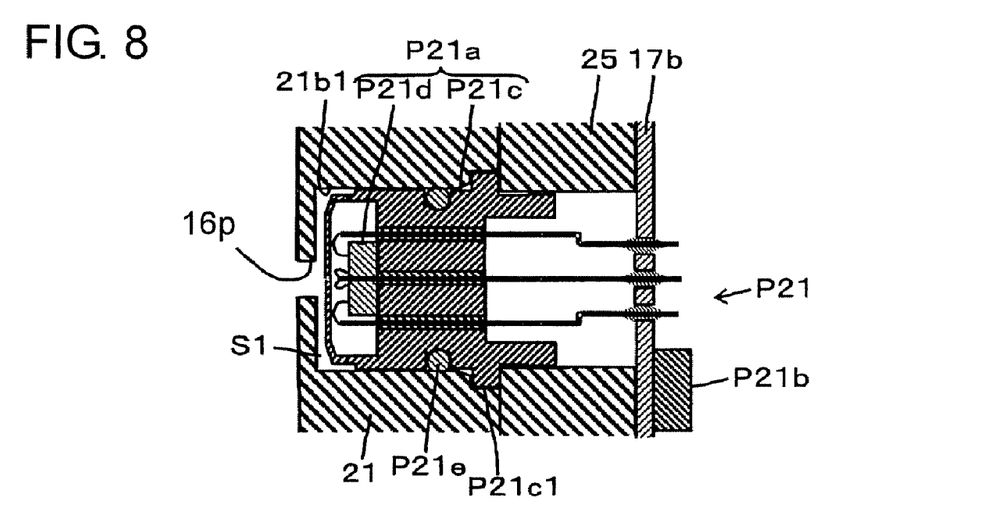
FIG. 8 is an enlarged sectional view showing a second modified form of the pressure sensor shown in FIG. 2.

FIG. 8 shows a pressure sensor in a second modified form. The pressure sensor designated as P21 in the second modified form comprises a detection section P21a and an arithmetic operation section P21b. The detection section P21a is provided with a detection section housing P21c and a sensor chip P21d built in one end portion of the detection section housing 21c. A kind of oil is filled up in a fluid-tight chamber which is formed at the one end portion of the detection section housing 21c to contain the sensor chip P21d. It is desirable to make the one end portion (i.e., a pressure detection end wall) of the detection section housing P21c of an elastic material. The detection section housing P21c is received in an attaching hole 21b1 formed in the housing 21. The attaching hole 21b1 is in communication with the oil passage 16p. A flange portion P21c1 of the detection section housing P21c is held in contact with the end plate 25, so that the detection section housing P21c is prevented from coming out of the attaching hole 21b1. A seal member (O-ring) P21e is interposed between a part of an outer wall of the detection section housing P21c and the internal surface of the attaching hole 21b1. The sensor chip P21d is electrically connected to the printed board 17b through conductive members. The arithmetic operation section P21b is an arithmetic processing IC mounted on the printed board 17b. The arithmetic operation section P21b processes a signal inputted from the sensor chip P21d to calculate a pressure value.

Second Embodiment

Next, with reference to FIG. 9, description will be made regarding a brake hydraulic pressure control device using a brush motor in a second embodiment according to the present invention. The second embodiment differs from the first embodiment in that the brush motor denoted as 134b is used in place of the aforementioned brushless motor 34b. The same components as those in the first embodiment are given the same reference numerals, and therefore, are omitted from being described for the sake of brevity.

Figure 9:
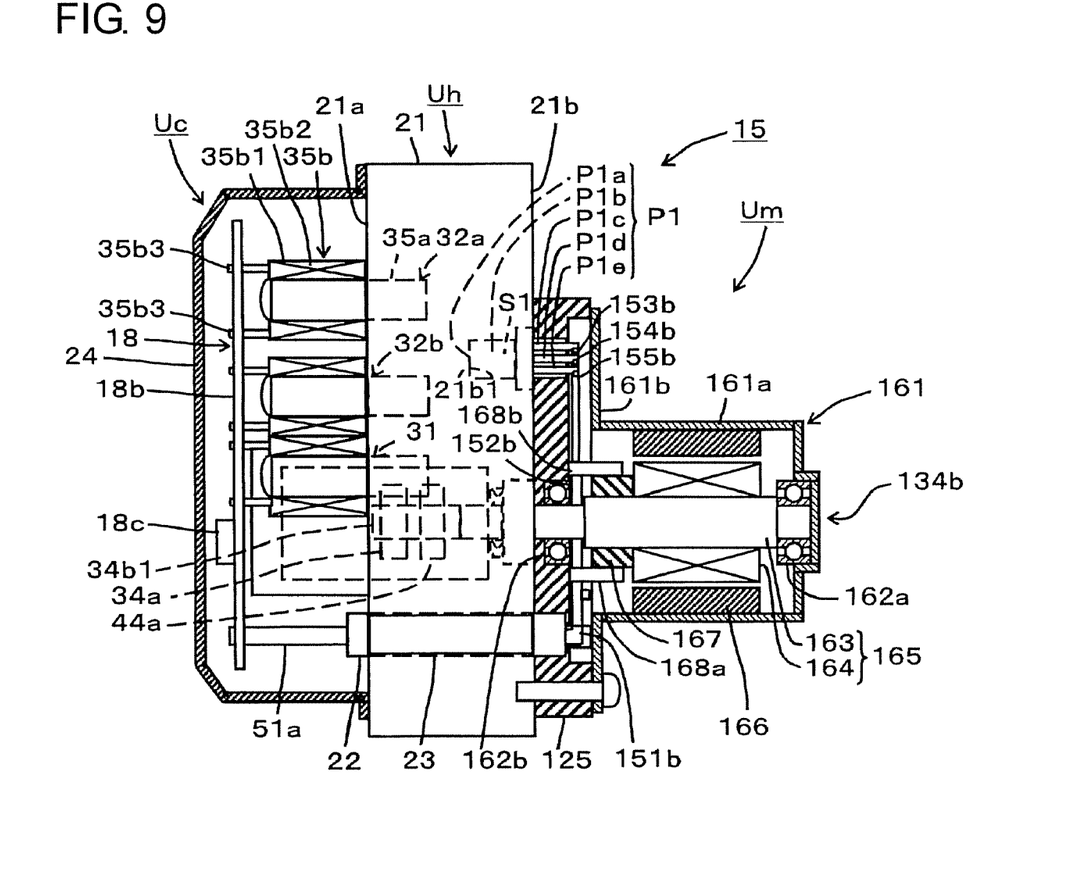
FIG. 9 is a front view, partly in section, of a brake hydraulic pressure control device in a second embodiment incorporating a brush motor according to the present invention.

As shown in FIG. 9, the brush motor 134b is composed of a motor cover or casing 161, an end plate 125, bearings 162a, 162b, a rotary spindle 163, coils 164, permanent magnets 166, a commutator 167 and a pair of brushes 168a, 168b.

The motor 134b is provided with the motor casing 161. The motor casing 161 is provided with a bottomed cylindrical portion 161a and a flange portion 161b which is connected to an opening circumferential edge of the bottomed cylindrical portion 161a. In the bottomed cylindrical portion 161a, the rotary spindle 163 which is rotatably supported by the bearings 162a and 162b is arranged on and along the axis of the bottomed cylindrical portion 161a. The coils 164 are secured to the circumferential surface of the rotary spindle 163. The rotary spindle 163 and the coils 164 constitute a rotor 165.

The permanent magnets 166 configured to be annular (or circular arc) in cross-section are secured to the internal wall surface of the bottomed cylindrical portion 161a. The permanent magnets 166 are magnetized to have S-poles and N-poles alternately at equiangular intervals in the circumferential direction. The permanent magnets 166 are arranged to encircle the coils 164.

An extreme end of the rotary spindle 163 extends into the housing 21 and is coupled to be rotatable bodily with the pumps 34a, 44a.

The commutator 167 is secured on the rotary spindle 163. The pair of brushes 168a, 168b which are secured to the end plate 125 to be isolated therefrom are held to bring respective extreme end portions thereof into mechanical contacts with the commutator 167.

The brushes 168a, 168b are connected to one ends of conductive members 151b, 152b, respectively. Other ends of the conductive members 151b, 152b are respectively connected to respective connection terminals of the connector section 22 in the same manner as described in the foregoing first embodiment.

Further, a lead terminal P1c (power line), a lead terminal P1d (ground line) and a lead terminal P1e (signal line) of the pressure sensor P1 are connected to one ends of conductive members 153b, 154b, 155b, respectively. Other ends of the conductive members 153b, 154b, 155b are connected to respective connection terminals of the connector section 22 in the same manner as described in the foregoing first embodiment. Each of other pressure sensors P2, P3 has three lead terminals, which are connected to three conductive members provided for the pressure sensor associated therewith, in the same manner as the pressure sensor P1. The conductive members (three for each pressure sensor) are also connected to respective terminals of the connector section 22.

Each of the aforementioned conductive members 151b-155b and those connected to the pressure sensors P1-P3 is covered with an insulating material except for opposite ends thereof naked for connection.

The foregoing second embodiment is constructed as mentioned above and can also attain the same operations and advantageous effects as those in the aforementioned first embodiment.

The foregoing embodiments may be modified to constitute the first converter 18c1 as a component discrete from the first CPU 18c and to constitute the second converter 17c1 as a component discrete from the second CPU 17c.

Although in the foregoing embodiments, the connector section 22 is constituted by the single connector section housing 22a, it may be constituted by two or more connector section housings. For example, where two connector section housings are used, the voltage line and the ground line for the motor drive power supply may be collected in one of the connector section housings, while other lines may be collected in the other connector section housing.

Further, the present invention is applicable not only to a brake hydraulic pressure control device for a forward vehicle follow travelling system which controls the travelling speed of the own vehicle to keep the distance from a vehicle travelling ahead in a predetermined range (i.e., vehicle-to-vehicle distance control) or for a brake assist system which utilizes the output hydraulic pressure of a pump at the time of an ordinary braking manipulation, but also to a brake hydraulic pressure control device for use in ESC (electronic stability control) or ABS (anti-lock brake system).

Although in the foregoing embodiments, the conductive members 51a-55a and the conductive members 51b-55b are disconnectable at the connector section 22, the present invention is not limited to such construction. The connections (wirings) therebetween may be made by soldering at the place of the connector section 22.

Obviously, numerous further modifications and variations of the present invention are possible in light of the above teachings. It is therefore to be understood that within the scope of the appended claims, the present invention may be practiced otherwise than as specifically described herein.

What is claimed is:

1. A brake hydraulic pressure control device for a vehicle, comprising:
    a housing having a first surface and a second surface different from the first surface;
    a plurality of electromagnetic valves mounted on the first surface of the housing for regulating hydraulic pressures applied to wheel cylinders for wheels of the vehicle;
    at least one pump provided in the housing for increasing the hydraulic pressures;
    an electric motor mounted on the second surface of the housing for driving the at least one pump;
    a cover member attached to the first surface of the housing and covering the plurality of electromagnetic valves;
    a first electronic control unit arranged in a space defined by the cover member and the housing for controlling the plurality of electromagnetic valves and the electric motor; and
    at least one pressure sensor for detecting at least one of the hydraulic pressures, the at least one pressure sensor being provided in a space defined between the electric motor and the second surface of the housing so that the at least one pressure sensor and the electric motor occupy a common area on the second surface of the housing.

2. The brake hydraulic pressure control device as set forth in claim 1, wherein the electric motor is a brushless motor, the device further comprising:
    a second electronic control unit provided on the side of the second surface and capable of driving the brushless motor and communicating with the first electronic control unit;
    conductive members electrically connecting the at least one pressure sensor to the second electronic control unit; and
    at least one signal line provided between the first and second electronic control units for transmitting an output signal of the at least one pressure sensor inputted to the second electronic control unit, from the second electronic control unit to the first electronic control unit.

3. The brake hydraulic pressure control device as set forth in claim 2, further comprising:
a first converter provided in the first electronic control unit for converting serial signals or parallel signals inputted thereto into parallel signals or serial signals to output the converted signals therefrom; and
a second converter provided in the second electronic control unit for converting serial signals or parallel signals inputted thereto into parallel signals or serial signals to output the converted signals therefrom;
wherein the at least one signal line provided between the first and second electronic control units comprises at least one conductive member for performing serial communication between the first and second converters.

4. The brake hydraulic pressure control device as set forth in claim 1, wherein the second surface is a surface opposite to the first surface.

5. The brake hydraulic pressure control device as set forth in claim 4, further comprising:
a second electronic control unit provided on the side of the second surface and capable of driving the electric motor and communicating with the first electronic control unit; and
a connector section housing passing through the housing from the first surface to the second surface so that conductive members including the at least one signal line extend in the connector section housing for data communication between the first and second electronic control units.

6. A brake hydraulic pressure control device for a vehicle, comprising:
a housing having a first surface and a second surface opposite to the first surface;
a plurality of electromagnetic valves mounted on the first surface of the housing for regulating hydraulic pressures applied to wheel cylinders for wheels of the vehicle;
at least one pump provided in the housing for increasing the hydraulic pressures;
an electric motor mounted on the second surface of the housing for driving the at least one pump;
a cover member attached to the first surface of the housing and covering the plurality of electromagnetic valves;
a first electronic control unit arranged in a space defined by the cover member and the housing for controlling the plurality of electromagnetic valves and the electric motor;
at least one pressure sensor for detecting at least one of the hydraulic pressures, the at least one pressure sensor being provided in a space defined between the electric motor and the second surface of the housing so that the at least one pressure sensor and the electric motor are arranged to occupy a common area on the second surface;
a second electronic control unit provided on the side of the second surface and capable of driving the electric motor and communicating with the first electronic control unit;
conductive members electrically connecting the at least one pressure sensor to the second electronic control unit; and
at least one signal line provided between the first and second electronic control units for transmitting an output signal of the at least one pressure sensor inputted to the second electronic control unit, from the second electronic control unit to the first electronic control unit.

7. The brake hydraulic pressure control device as set forth in claim 6, further comprising:
a first converter provided in the first electronic control unit for converting serial signals or parallel signals inputted thereto into parallel signals or serial signals to output the converted signals therefrom; and
a second converter provided in the second electronic control unit for converting serial signals or parallel signals inputted thereto into parallel signals or serial signals to output the converted signals therefrom;
wherein the at least one signal line provided between the first and second electronic control units comprises at least one conductive member for performing serial communication between the first and second converters.

8. A brake hydraulic pressure control device for a vehicle, comprising:
a housing having a first surface and a second surface different from the first surface;
a plurality of electromagnetic valves mounted on the first surface of the housing for regulating hydraulic pressures applied to wheel cylinders for wheels of the vehicle;
at least one pump provided in the housing for increasing the hydraulic pressures;
an electric motor mounted on the second surface of the housing for driving the at least one pump;
the electric motor being provided with a casing attached to the second surface of the housing, the motor including a rotor positioned in the casing;
a cover member attached to the first surface of the housing and covering the plurality of electromagnetic valves;
a first electronic control unit arranged in a space defined by the cover member and the housing for controlling the plurality of electromagnetic valves and the electric motor;
at least one pressure sensor for detecting at least one of the hydraulic pressure;
the at least one pressure sensor being positioned in a hole that opens to the second surface of the housing; and
the at least one pressure sensor and the casing overlapping one another.

9. The brake hydraulic pressure control device as set forth in claim 8, further comprising a second electronic control unit adapted to drive the electric motor and to communicate with the first electronic control unit, the second electronic control unit being covered by the casing and connected to the at least one pressure sensor.

10. The brake hydraulic pressure control device as set forth in claim 8, wherein the second electronic control unit overlaps the at least one pressure sensor.

* * * * *